(12) United States Patent
Hiruma et al.

(10) Patent No.: US 6,202,724 B1
(45) Date of Patent: Mar. 20, 2001

(54) PNEUMATIC TIRE AND METHOD OF MANUFACTURING THE SAME

(75) Inventors: Masato Hiruma, Inagi; Akio Kusano; Yasuyo Fujita, both of Kodaira, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/130,879

(22) Filed: Aug. 7, 1998

(30) Foreign Application Priority Data

Aug. 7, 1997 (JP) .................................. 9-212955
Sep. 17, 1997 (JP) .................................. 9-251771

(51) Int. Cl.$^7$ .............. B60C 1/00; B60C 19/08; B60C 11/00; B29D 30/52
(52) U.S. Cl. .................... 152/152.1; 152/209.5; 152/209.8; 152/DIG. 2; 156/123; 156/128.1; 156/128.6; 156/129
(58) Field of Search ............... 152/152.1, 209.5, 152/209.8, DIG. 2; 156/123, 128.1, 128.6, 129

(56) References Cited

U.S. PATENT DOCUMENTS

| | | | |
|---|---|---|---|
| 2,339,546 | * 1/1944 | Hanson | 152/DIG. 2 |
| 3,931,844 | * 1/1976 | Mirtain | 152/209.5 |
| 4,385,653 | * 5/1983 | Okazaki et al. | 152/209.5 |
| 4,478,266 | * 10/1984 | Pierson et al. | 152/209.5 |
| 5,225,011 | * 7/1993 | Takino et al. | 152/209.5 |
| 5,518,055 | * 5/1996 | Teeple et al. | 152/152.1 |
| 5,898,047 | * 4/1999 | Howald et al. | 152/152.1 |
| 5,937,926 | * 8/1999 | Powell | 152/152.1 |
| 5,942,069 | * 8/1999 | Gerresheim et al. | 152/152.1 |

FOREIGN PATENT DOCUMENTS

| | | | |
|---|---|---|---|
| 597008 | * 3/1978 | (CH) | 152/152.1 |
| 341187 | * 11/1989 | (EP) | 152/209.5 |
| 0 658 452 A1 | 6/1995 | (EP) . | |
| 718126 | * 6/1996 | (EP) | 152/DIG. 2 |
| 732229 | * 9/1996 | (EP) | 152/209.5 |
| 747243 | * 12/1996 | (EP) | 152/DIG. 2 |
| 798142 | 10/1997 | (EP) . | |
| 819555 A1 | 1/1998 | (EP) . | |
| 819741 A2 | 1/1998 | (EP) . | |
| 838353 | 4/1998 | (EP) . | |
| 819741 A3 | 10/1998 | (EP) . | |
| 544757 | * 4/1942 | (GB) | 152/152.1 |
| 2-162104 | * 6/1990 | (JP) | 152/209.5 |
| 4-95508 | * 3/1992 | (JP) | 152/209.5 |
| 4-133802 | * 5/1992 | (JP) | 152/209.5 |
| 6-16013 | * 1/1994 | (JP) | 152/209.5 |

OTHER PUBLICATIONS

Patent Abstracts of Japan, V1999, N10, Aug. 31, 1999 (JP 11–139107, May 25, 1999).
Patent Abstracts of Japan, V1999, N5, May 31, 1999 (JP 11–048711, Feb. 23, 1999).

* cited by examiner

*Primary Examiner*—Steven D. Maki
(74) *Attorney, Agent, or Firm*—Sughrue, Mion, Zinn, Macpeak & Seas, PLLC

(57) ABSTRACT

A pneumatic tire comprising a silica-rich compound tread provided with an antistatic conductive rubber layer has improved safty based on durability and extrusion productivity. In this tire, the silica-rich compound rubber layer is divided at at least one portion in a width directional of the tire by a conductive rubber layer extended in a circumferential direction substantially over the whole thickness of said rubber layer. In this case, a thickness direction distance a in a width directional section of said rubber layer and an edge face length b of a divisional rubber layer consisting of said conductive rubber layer in a width directional section satisfy a relation formulated by the following expression, a<b.

13 Claims, 5 Drawing Sheets

(a)

(b)

PNEUMATIC TIRE AND METHOD OF MANUFACTURING THE SAME

BACKGROUND OF THE INVENTION

1. Field of the Invention

The present invention relates to a pneumatic tire comprising a silica-rich compound tread rubber provided with an antistatic conductive rubber layer. It particularly relates to a pneumatic tire having improved safety based on durability and extrusion productivity.

2. Description of the Related Art

In a prior pneumatic tire, a proper amount of carbon black is contained in tread rubber, and there is no problem relating to electrical resistance of a tire or a problem relating to accumulation of charge amount. However, environmental concerns have recently been serious, and a movement of lowering fuel consumption of vehicles has been accelerated. In order to attain low fuel consumption, i.e., mitigation of rolling resistance by improving tread rubber, it is necessary to decrease carbon black as a cause for producing hysteresis loss, and there is today given attention to silica —containing tread rubber by decreasing an amount of carbon black, as tread rubber having excellent low fuel consumption performance. In order to coexist running performance and low fuel consumption performance of a tire at a high level, particularly in a pneumatic radial tire having cap/base structure of a tread, there is a tendency to increase cases of using silica-rich compound rubber as rubber for a cap layer. As a result, there is newly caused a problem relating to electrical resistance and a problem relating to accumulation of a charge amount.

As a solution of such problems, for example, as disclosed in European Patent Specification No. 658 452, there has been known a technique of inserting a conductive rubber layer 20 from a tread surface to tread underlayer rubber at the width directional center portion of a tread 10 (FIG. 7). In this pneumatic tire, as illustrated, a connected face between the conductive rubber layer 20 and the silica-rich rubber layer 10 provided in the tread is perpendicular to the ground-contact surface of the tire.

As described above, a pneumatic tire in which the conductive rubber layer is provided to be perpendicular to the ground-contact surface of the tire sufficiently exhibits antistatic effect because the layer is constantly grounded, but the conductive rubber layer and the silica-rich rubber layer tend to peel off at the connected face due to strain produced in the tire when running, and thus there is a problem from the aspect of tire safety. That is, as disclosed in the above European Patent Specification No. 658 452, if the conductive rubber layer is inserted from the surface to the underlayer rubber in the silica-rich compound tread, in such a case that the tire receives the transverse directional force particularly when the vehicle receives a side wind during high speed running, as shown in FIG. 8, the conductive rubber layer 20, which is heterogeneous from the other tread portion 10, peels off from the boundary face, and this peeling-off has a problem to be continuously extended on the circumference of the tire. Such problem also occurs at the time of revolving and running in like manner. Once the peeling-off occurs, tire durability is considerably lowered.

SUMMARY OF THE INVENTION

Therefore, an object of the invention is to provide a pneumatic tire capable of positively securing antistatic effect without damaging driving safety based on durability of the tire.

Moreover, another object of the invention is to provide a pneumatic tire sufficiently exhibiting antistatic effect and simultaneously showing driving safety viewed from durability, and further having improved extrusion productivity.

As a result of study for solving the above problems, in case of forming a current path by applying a conductive rubber layer to a tread, the inventors have found that the conductive rubber layer can be prevented from peeling off by extending a divisional layer consisting one conductive rubber layer to the oblique direction against the thickness direction in a width directional section of the tread rubber layer, to effectively disperse force received from the tire transverse direction, and to restrain movement of the conductive rubber layer and rubber deformation at the boundary face.

Moreover, the inventors have found that further higher extrusion productivity can be obtained by arranging a conductive rubber layer of specific thickness in V-shape or reverse V-shape in a width directional section at the tread of a silica-rich rubber layer of the tire to form a conductive path.

According to the invention, there is the provision of a pneumatic tire having a silica-rich compound rubber layer on at least the surface portion of a tread, in which the silica-rich compound rubber layer is divided at at least one portion in a width directional section of the tire by a conductive rubber layer extended in a circumferential direction substantially over the whole thickness of the rubber layer, wherein a thickness direction distance a in a width directional section of the rubber layer and an edge face length b of a divisional rubber layer consisting of the conductive rubber layer in a width directional section satisfy a relation formulated by the following expression, a<b.

In a preferred embodiment of the invention, a specific resistance value of the silica-rich compound rubber layer after curing is not less than $10^8$ Ω·cm, a specific resistance value of the conductive rubber layer is not more than $10^6$ Ω·cm, the conductive rubber layer is 0.1–3.0 mm, preferably 0.5–2.0 mm in width, and the edge face length b is 50–100% of a ground-contact width W of the tire.

In another preferred embodiment of the invention, a divisional form in a width directional section of the divisional rubber layer shows a substantially linear shape or a corrugated shape.

In the other preferred embodiment of the invention, the tread has at least two-layer structure comprising a cap rubber layer of the silica-rich compound rubber layer in its surface portion and a base rubber layer which is in downward from the cap rubber layer in the radial direction.

According to the invention, it is preferable that the conductive rubber layer consists of a rubber cement layer or conductive sheet having a specific resistance value of not more than $10^6$ Ω·cm after curing.

In the still other preferred embodiment of the invention, the conductive rubber layer is formed into a V- or a reverse V-shape with 0.1–3.0 mm thick in a width directional section of the tire. In this case, it is favorable that the ratio (A/B) of a sectional area A of the conductive rubber layer to a sectional area B of the silica-rich compound rubber layer in a width directional section of the tire is within a range of 0.02–0.1, and when the tread has at least two-layer structure comprising a cap rubber layer of the silica-rich compound rubber layer in its surface portion and a base rubber layer which is downward from the cap rubber layer in the radial direction, the ratio (A/B) of the sectional area A to the sectional area B of the cap rubber layer is within a range of 0.02–0.1.

According to the invention, both wings of the tread may be provided with miniside rubber layers.

Further, the invention provides a method of manufacturing a pneumatic tire, which comprises simultaneously extruding a tread portion of silica-rich compound and an antistatic conductive rubber layer, so as to form the conductive rubber layer of 0.1–3.0 mm thick into a V- or a reverse V-shape in a width directional section of the tire at the tread.

Furthermore, the invention provides a method of manufacturing a pneumatic tire, which comprises dividing a tread portion of silica rich compound into three portions in a V- or a reverse V-shape in a width directional section of the tire, adhering a conductive rubber layer consisting of a conductive rubber sheet or conductive cement layer to at least one of the surfaces resulted from the division, thereafter connecting both the divided tread pieces into one through the conductive rubber layer.

In the latter method invention, it is preferable that the temperature is not less than room temperature when both the divided tread pieces are connected with each other, and a press bonding step is provided after connecting the tread pieces each other.

In the pneumatic tire according to the invention, the conductive rubber layer arranged in a silica-rich compound tread is oblique against a tread thickness direction in a width directional section of the tire, particularly formed into a V-shape or a reverse V-shape, to widen a connecting area between the conductive rubber layer and the silica-rich rubber layer, to disperse stress due to strain applied to the tire during running, that is, to minimize stress applied to any point of the connecting face, and as a result, anti-peelability at such connecting face is improved. Moreover, in case of forming a silica-rich tread of the pneumatic tire according to the invention by extrusion, the volume balance of the conductive rubber layer with the silica-rich rubber extruded simultaneously therewith is kept, as compared with prior art, particularly the volume ratio can be optimized, thereby enhancing extrusion speed and improving productivity.

DESCRIPTION OF THE PREFERRED EMBODIMENTS

Diene rubber used for a rubber composition for a conductive rubber layer capable of materializing specific resistance of not more than $10^6$ $\Omega$·cm according to the present invention preferably includes at least one of styrene butadiene rubber (SBR), butadiene rubber (BR) or natural rubber (NR) viewed from durability.

Moreover, in the rubber composition for the conductive rubber layer, it is preferable to use carbon black having not less than 130 $m^2$/g of a nitrogen adsoprtion specific surface area ($N_2SA$) and not less than 110 ml/100 g of a dibutyl phthalate oil absorption amount (DBP). The use of such carbon black of small particle size and high structure improves durability of a rubber layer having a current path and exhibits antistatic effect till the running end of a tire. Here, $N_2SA$ is a value obtained according to ASTM D3037-89, and DBP is a value obtained according to ASTM D2411-90, respectively.

If a compounding amount of such carbon black is not more than 40 parts by weight based on 100 parts by weight of diene rubber, reinforcement is not sufficient. If it exceeds 100 parts by weight, when a softener is not sufficient, the layer becomes too hard after curing and produces cracks. When the softener is too great, abrasion resistance is lowered. Moreover, as compounding agents other than carbon black, use may be made of compounding agents, usually used in rubber products, such as curing agent, vulcanization accelerator, vulcanization acceleration assistant, softener, antioxidant and the like in usual amount.

According to the invention, the conductive rubber layer consists preferably of a rubber cement layer or conductive sheet having a specific resistance value of not more than $10^6$ $\Omega$·cm after curing. Here, it is possible to use water as a solvent for the rubber cement layer, but it is preferable to use an organic solvent as a base for stabilizing the quality. As organic solvents, mention may be made of hexane, petroleum ether, heptane, tetrahydrofuran (THF), cyclohexane and the like, preferably hexane. The conductive rubber layer consisting of a rubber cement layer can be, for example, provided by pouring into corrugated cuts of a tread or applying from the surface to the base of a tread. Such cuts can be formed by cutting means such as a cutter and the like. Rubber cement has such an advantage that it is easily introduced into cuts. On the other hand, the conductive sheet can be provided by inserting into cuts of the tread at the time of molding a tire.

Next, the structure of a pneumatic tire as one embodiment of the invention is explained in detail.

Figure 1:
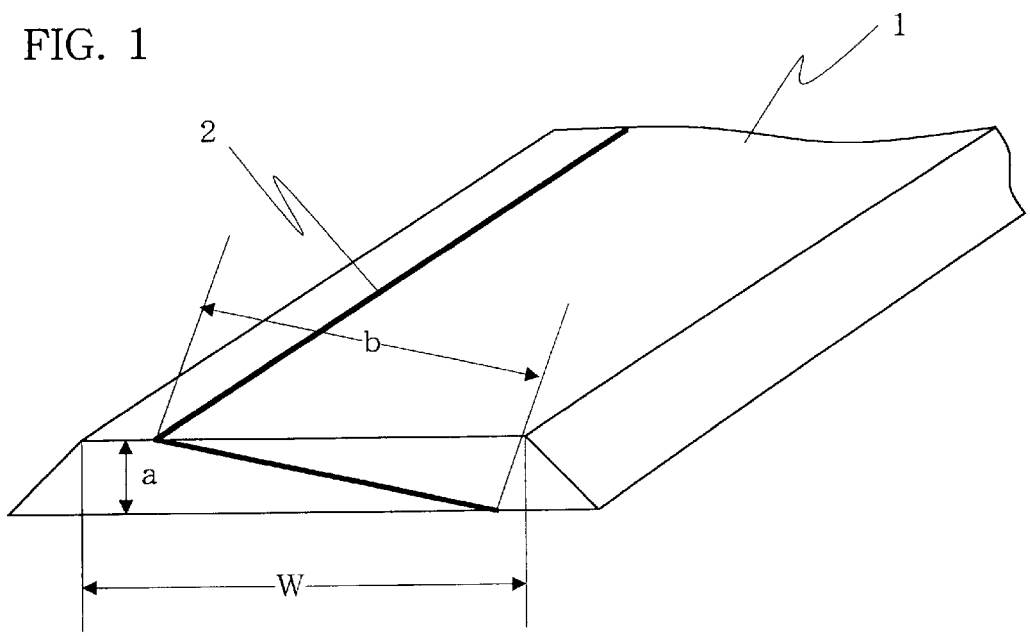
FIG. 1 is a sectional perspective view schematically showing the tread portion of a pneumatic tire as one example of the invention.

In the present preferable pneumatic tire, as shown in FIG. 1, a conductive rubber layer 2 is extended in a silica-rich tire tread 1 from a tread surface at at least one potion of its width direction substantially over the whole thickness a of the tread 1 in the circumferential direction, and the tread 1 is divided by the conductive rubber layer in a width directional section. In the present invention, it is important that an edge face length b of a divisional rubber layer consisting of the conductive rubber layer 2 of 0.1–3.0 mm, preferably 0.5–2.0 mm in width is longer than the whole thickness a. In the present preferable embodiment shown in FIG. 1, the divisional form in a width directional section of the divisional rubber layer is linearly extended in the oblique direction against the direction of the thickness a.

If a width of the conductive rubber layer 2 is not less than 0.1 mm, the introduction of the conductive rubber layer in the form of cement is not insufficient, and the conductive rubber layer is positively introduced over the whole width of a tread. Moreover, if the width is not more than 3.0 mm, the rolling resistance of a tire is not worsened, and the boundary face between the tread rubber and the conductive rubber layer is not affected by peeling off. Moreover, as the divisional face formed by the conductive rubber layer 2 is extended in the oblique direction against the thickness direction in a width directional section of the tread rubber layer, force applied to a transverse direction of the tire is effectively dispersed, movement of the conductive rubber layer and rubber deformation of the boundary face between the conductive rubber layer and the tread rubber are restrained, and as a result the conductive rubber layer can be prevented from peeling off.

The edge face length b in a width directional section of the divisional rubber layer consisting of the conductive rubber layer 2 is preferably 50–100% of a ground-contact width W of the tire. If the length is less than 50%, force dispersion in the tread thickness direction is insufficient, and thus improvement of durability cannot be expected. If the length exceeds 100%, the conductive layer deviates from the ground-contact surface and thus antistatic effect cannot be obtained. Here, "ground-contact width" means the maximum linear distance in the tire axial direction at the tire ground-contact surface when prescribed weight is added by mounting the tire on a rim to be applied, setting prescribed atmospheric pressure, and placing the tire perpendicuclar to a flat board at the standstill, and in JATMA standard, according to 1996 JATMA YEAR BOOK, the tire is mounted on a standard rim based on the maximum load capacity at applicable size and ply rating and atmospheric pressure (maximum atmospheric pressure) corresponding thereto. According to a use place or a manufacturing place, TRA standard and ETRTO standard are kept, respectively, when they are applied to.

Figure 2:
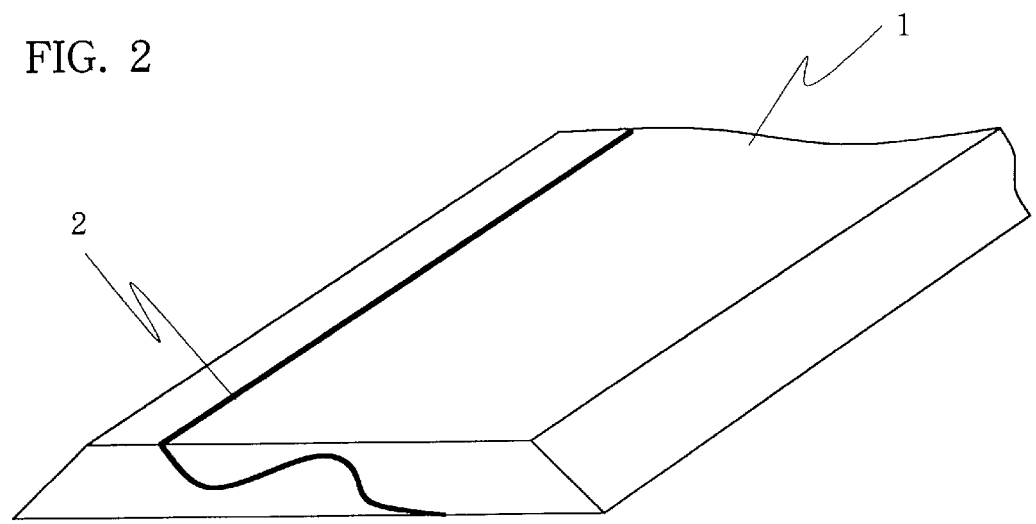
FIG. 2 is a sectional perspective view schematically showing the tread portion of a pneumatic tire as another example of the invention.

Moreover, the divisional form in a width directional section of the divisional face formed by the conductive rubber layer 2 is preferably substantially linear as shown in FIG. 1, but may preferably be corrugated as shown in FIG. 2.

Furthermore, silica-rich tread rubber is compounded with a large amount of silica for coexsisting running performance on wet road surface and low fuel consumption performance of a tire at a high level. Therefore, a specific resistance value of the tire tread 1 is not less than $10^8$ Ω·cm.

Figure 3:
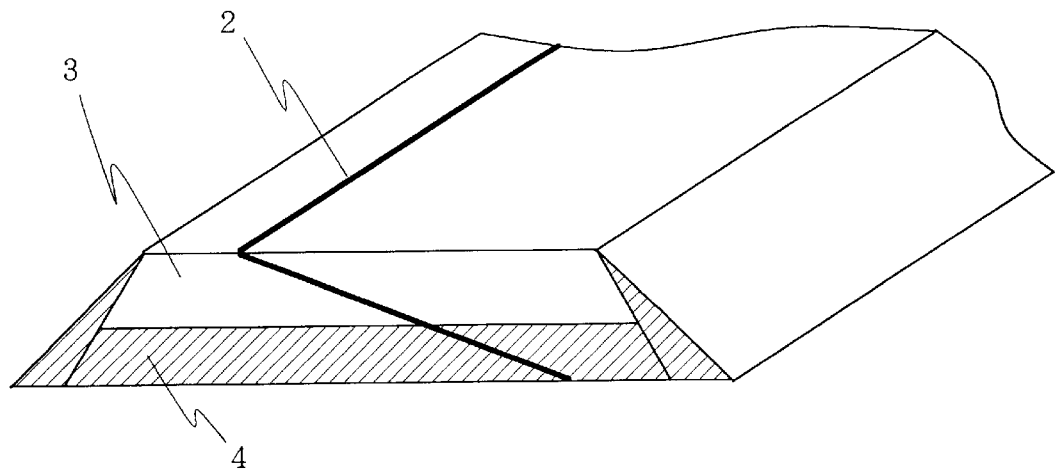
FIG. 3 is a sectional perspective view schematically showing the tread portion of a pneumatic tire as a further example of the invention.

According to the invention, as shown in FIG. 3, even if the tread has a two-layer structure provided with a cap rubber layer 3 of the silica-rich compound rubber on its surface portion and a base rubber layer 4 which is in downward from the cap rubber layer in the radial direction, and the conductive rubber layer 2 is substantially extended over the whole thickness of the cap rubber layer 3 in the circumferential direction, the same effect of the invention can be obtained as described above.

Next, the structure of a pneumatic tire as another embodiment of the invention is explained in detail.

Figure 4:
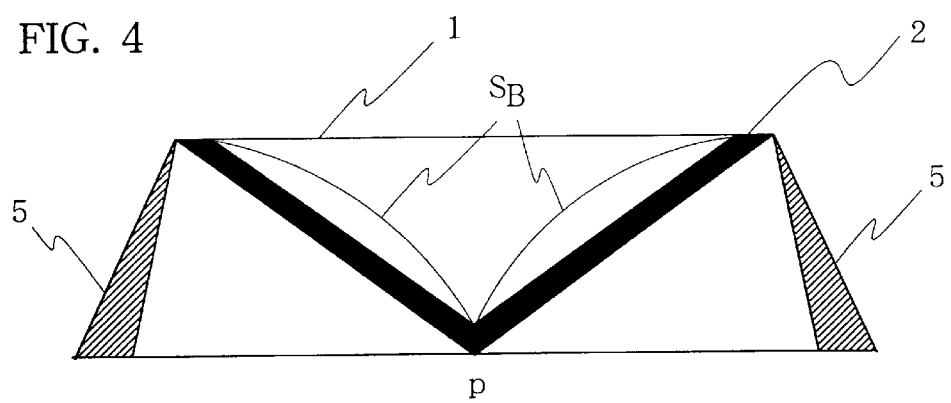
FIG. 4 is a sectional perspective view schematically showing the tread portion of a pneumatic tire as a still further example of the invention.

In a preferable embodiment of the pneumatic tire of the invention shown in FIG. 4, the tread 1 consists of a silica-rich rubber layer, and both wings of the tread 1 are provided with miniside rubber layers 5. A specific resistance value of this tread 1 is not less than $10^8$ Ω·cm due to silica-rich compound. In this tread 1 is formed a V-shaped conductive rubber layer 2 in a width directional section of the tire, both the tread upper ends of the conductive rubber layer 2 are within the ground-contact surface, and the tread lower end is extended to a position substantially dividing the tread 1 in a width directional section of the tire. Moreover, here, "substantially divide" includes the case when discharge effect can be obtained in the same manner as the case of complete division, and thinness is remained to a degree of serving for connection at the time of molding.

When connecting areas of the conductive rubber layer and the silica-rich rubber layer in the tread of the present pneumatic tire and in the prior silica rich tread of a tire (FIG. 9) of the same kind having a conductive rubber layer are regarded as $S_B$ and $S_A$, respectively, $S_A<S_B$, and the peeling-off of the former is more difficult. Moreover, since the conductive rubber layer 2 divides the tread 1 into three portions at point p in FIG. 4, it is possible to favorably secure conductivity of the tread. Furthermore, in case of forming a silica-rich tread 1 by extrusion, the volumes of the conductive rubber layer and the other rubber layers are well balanced as compared with the prior tread shown in FIG. 9, so that extrusion speeds of each layer can be made same, and thus workability is excellent.

In the aforementioned case, a thickness of the conductive rubber layer 2 is preferably 0.1–3.0 mm. If this width is not less than 0.1 mm, it is sufficient for forming a current path. If the width is not more than 3 mm, the rolling resistance of the tire is not worsened.

Moreover, the ratio (A/B) of the sectional area A of the conductive rubber layer 2 as a conductive rubber sheet to the sectional area B of the tread 1 in a width directional section of the tire is preferably within a range of 0.02–0.1. If this ratio is less than 0.02, any improved effect of extrusion productivity cannot be expected, while if the ratio exceeds 0.1, it is difficult to coexist running performance and low fuel consumption performance of a tire as characteristics of silica compound tread at a high level.

Furthermore, even in case of providing the conductive rubber layer 2 in a V-shape as described above, the tread 1 may have at least two-layer structure comprising a cap rubber layer of the silica-rich compound in its surface portion and a base rubber layer which is in downward from the cap rubber layer in the radial direction. In this case, the ratio (A/B) of the sectional area A of the conductive rubber sheet to the sectional area B of the cap rubber layer in a tire width directional section of the tire is preferably within a range of 0.02–0.1

Figure 5:
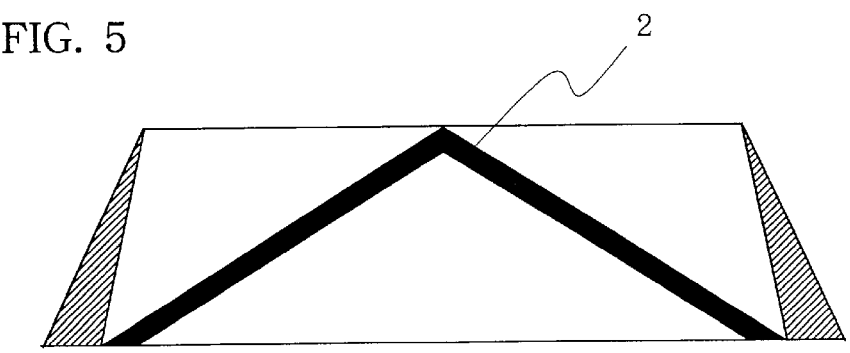
FIG. 5 is a sectional perspective view schematically showing the tread portion of a pneumatic tire as a still more example of the invention.

A further preferred embodiment of the present pneumatic tire is shown in FIG. 5. In FIG. 5, a conductive rubber layer 2 is formed in a reverse V-shape in a width directional section of the tire at the same tread 1. The tread upper end of the conductive rubber layer 2 is extended to a position substantially dividing the tread 1 in a width directional section of the tire, and both the tread lower ends reach the tread base. Here, "substantially divide" means the same as described above.

Next, a method of manufacturing a pneumatic tire according to the invention, in which a conductive rubber layer is formed into a V- or a reverse V-shape in a width directional section of the tire is explained in detail.

In a preferred embodiment of the manufacturing method of the invention, the simultaneous extrusion of a tread portion of silica-rich compound and an antistatic conductive rubber layer forms the conductive rubber layer into a V- or a reverse V-shape in thickness of 0.1–3.0 mm in a width directional section of the tire at the tread. Such simultaneous extrusion can balance the volume of the conductive rubber layer with that of the simultaneously extruded silica-rich rubber since the conductive rubber layer is formed into a V- or a reverse V-shape in a width directional section of the tire. As a result, an extrusion speed can be increased by optimizing the volume ratio, and thus productivity can be improved as compared with the prior art.

Moreover, another preferred embodiment of the invention, first, a silica-rich tread portion is divided into three parts in a V- or a reverse V-shape in a width directional section of the tire. Such division is carried out by extruding three parts separately, or by extruding one tread and then dividing (slitting) it into three parts by means of a cutter and the like. Then, the conductive rubber layer consisting of a conductive rubber sheet or conductive cement layer is adhered to at least one of the surfaces resulted from the division. After adhering the conductive rubber layer to the resulting surface, both the divided tread pieces are connected into one through the conductive rubber layer at a temperature of preferably not less than room temperature. In case of connecting and press bonding through the conductive rubber layer, the connecting portion is press-bonded by passing through a stitcher roll or a profile roll.

As explained above, according to the present pneumatic tire, in which a current path is formed by applying the conductive rubber layer to a tread, the divisional face formed by one conductive rubber layer is extended in the oblique direction against the thickness direction in a width directional section of a tread rubber layer, whereby force applied to a transverse direction of the tire is effectively dispersed to prevent the conductive rubber layer from peeling off, and antistatic effect can positively be secured without damaging durability. Moreover, the formation of a conductive path by arranging the V- or the reverse V-shaped conductive rubber layer in a width directional section of the tire at the tread of the silica-rich rubber layer can sufficiently exhibit antistatic effect and at the same time, can restrain crack occurrence at the connecting face between the conductive rubber layer and the silica-rich rubber layer, and as a result, the present pneumatic tire can be provided with excellent safety and high extrusion productivity.

The following examples are given for the purpose of illustration of this invention and are not intended as limitations thereof.

EXAMPLES 1–2

Comparative Example and Conventional Example

According to compounding prescriptions shown in the following Tables 1 and 2, rubber compositions used for a silica-rich rubber layer and a conductive rubber layer of a pneumatic radial tire were prepared, respectively.

TABLE 1

| Silica-rich rubber layer | |
| --- | --- |
| | Amount |
| Styrene butadiene rubber [*1] | 96 (part by weight) |
| Butadiene rubber [*2] | 30 |
| SiO$_2$ [*3] | 60 |
| Carbon black (N234) [*4] | 20 |
| Silane coupling agent [*5] | 6 |
| ZnO | 3 |

TABLE 1-continued

| Silica-rich rubber layer | |
| --- | --- |
| | Amount |
| Stearic acid | 2 |
| Aromatic oil | 10 |
| Vulcanization accelerator (CBS) [*6] | 1.5 |
| Vulcanization accelerator (DPG) [*7] | 2 |
| Sulfur | 1.5 |

[*1] SBR1712 made by JSR
[*2] 96% cis-bound
[*3] Nipsil VN3
[*4] N$_2$SA: 126m$^2$/g DBP: 125 ml/100 g
[*5] Si69 made by DEGUSSA
[*6] N-cyclohexyl-2-benzothiazylsulfenamide
[*7] diphenylguanidine

TABLE 2

| Conductive rubber layer | |
| --- | --- |
| | Amount |
| Natural rubber | 40 (part by weight) |
| Styrene butadiene rubber [*8] | 60 |
| Carbon black (N134) [*9] | 60 |
| Aromatic oil | 15 |
| ZnO | 2 |
| Antioxidant [*10] | 1 |
| Vulcanization accelerator (DPG) | 0.2 |
| Vulcanization accelerator (NS) [*11] | 0.8 |
| Sulfur | 1.5 |

Figure 7:
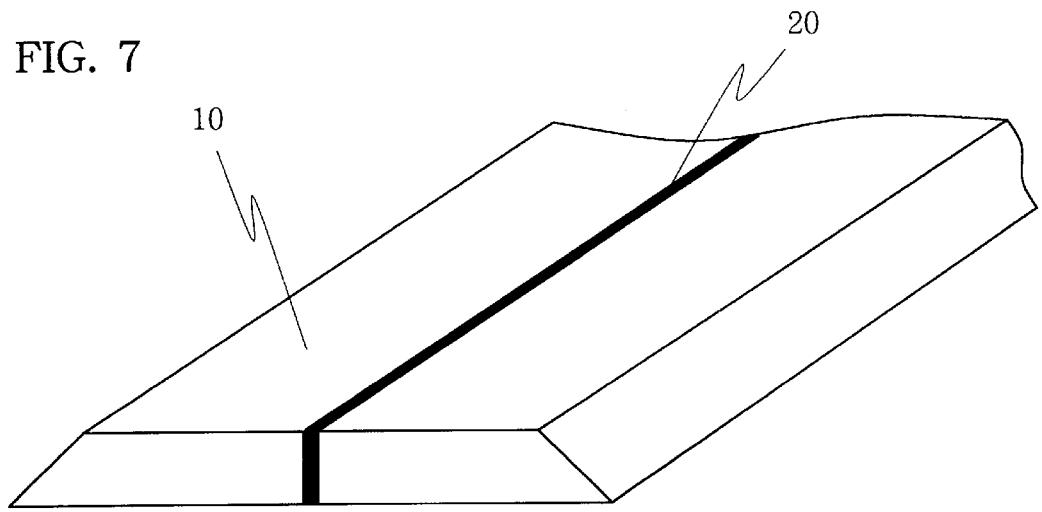
FIG. 7 is a sectional perspective view schematically showing the tread portion of a pneumatic tire used in Comparative Example.
Figure 8:
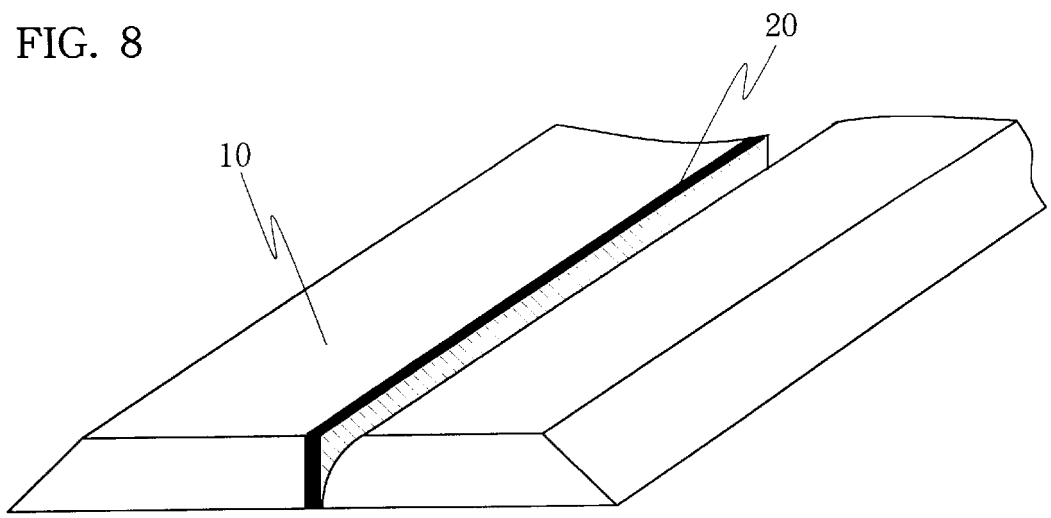
FIG. 8 is a sectional perspective view schematically showing the state of peeling occurrence at the tread portion of a pneumatic tire used in Comparative Example.

[*8] SBR1500 made by JSR
[*9] N$_2$SA: 146 m$^2$/g DBP: 127 ml/100 g
[*10] N-(1,3-dimethylbutyl)-N'-phenyl-p-phenylenediamine
[*11] N-tert-butyl-2-benzothiazolylsulfenamide The thus obtained conductive rubbers were applied as a conductive rubber layer 2 to a tread 1 as shown in FIGS. 1, 3 and 7, and test pneumatic radial tires of size 185/65R14 were manufactured.

In Example 1, as shown in FIG. 1, the divisional face formed by one conductive rubber layer 2 is linearly extended in the oblique direction against the thickness direction in a width directional section of a tread 1. The thickness of this conductive rubber layer 2 in a width directional section of the tire is 1 mm, and the edge face length b in width directional section of the divisional rubber layer consisting of the conductive rubber layer 2 is 80% of the tire ground-contact width W.

In Example 2, as shown in FIG. 3, in the tread of cap/base structure, the divisional face formed by one conductive rubber layer 2 is linearly extended in the oblique direction against the thickness direction in a tread width directional section of the tire, and reached the under surface of the base layer. The thickness of this conductive rubber layer 2 in a width directional section of the tire is 1 mm, and the edge face length b in a width directional section of the divisional rubber layer consisting of the conductive rubber layer 2 is 80 % of a ground-contact width W of the tire.

Figure 6:
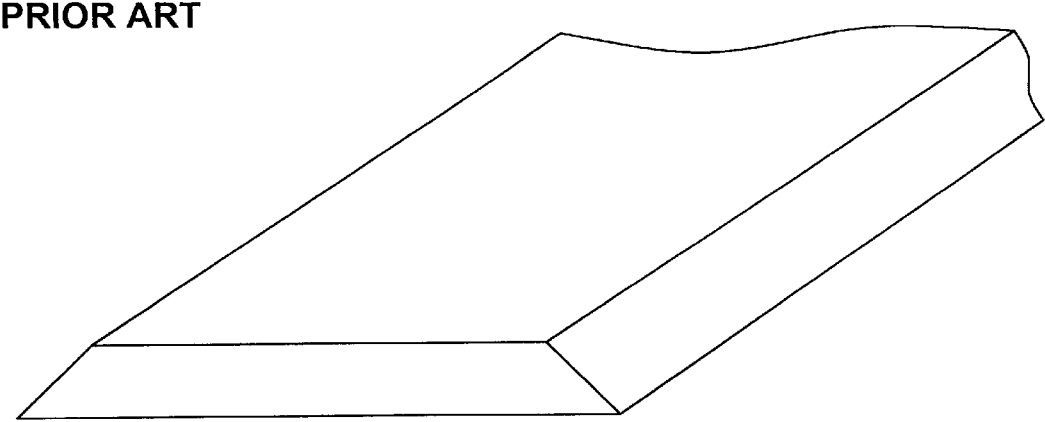
FIG. 6 is a sectional perspective view schematically showing the tread portion of a pneumatic tire of Conventional Example 1.

Conventional Example 1 is, as shown in FIG. 6, an example of the same tire as the above examples, except that the conductive rubber layer 2 is not inserted.

Comparative Example is, as shown in FIG. 7, an example of the same tire as the above examples, except that a conductive rubber layer of 5 mm thickness in a width directional section of the tire is continuously formed in the circumferential direction at the tire center.

Resistance values (electrical resistance values) of these tires are obtained as follows.

Figure 10:
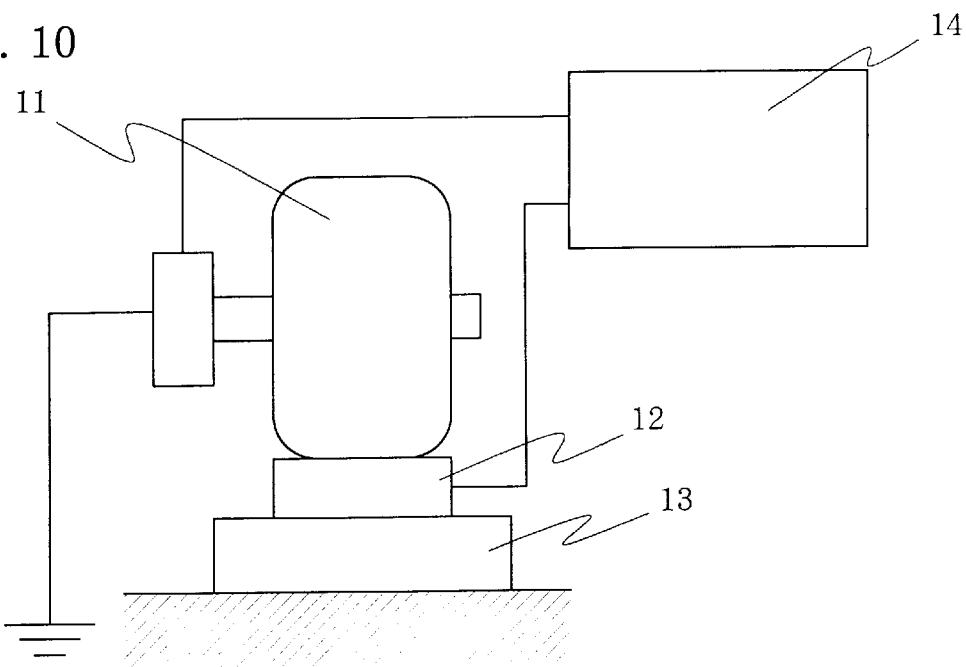
FIG. 10 is a schematic diagram of a specific resistance value measuring device used in Examples.

That is, resistance values were measured as shown in FIG. 10 with the use of a high resistance meter of Model HP4339A made by HEWLETT PACKARD according to WdK 110 sheet 3 of GERMAN ASSOCIATION OF RUBBER INDUSTRY. In FIG. 10, 11 is a tire, 12 a steel plate, 13 an insulator, 14 a high resistance meter, and measurement was carried out by flowing a current of 1000V between the steel plate 12 on the insulator 13 and a rim of the tire 11.

Moreover, a specific resistance values of the conductive rubber layer 2 were obtained as follows.

That is, a disk-shaped sample was manufactured, an electrical resistance value R at the portion of radius: r=2.5 cm and thickness t=0.2 cm was measured with the use of an insulation resistance test box made by ADVANCE, and a specific resistance value ρ was calculated by the following equation $$\rho = (a/t)R.$$

Figure 11:
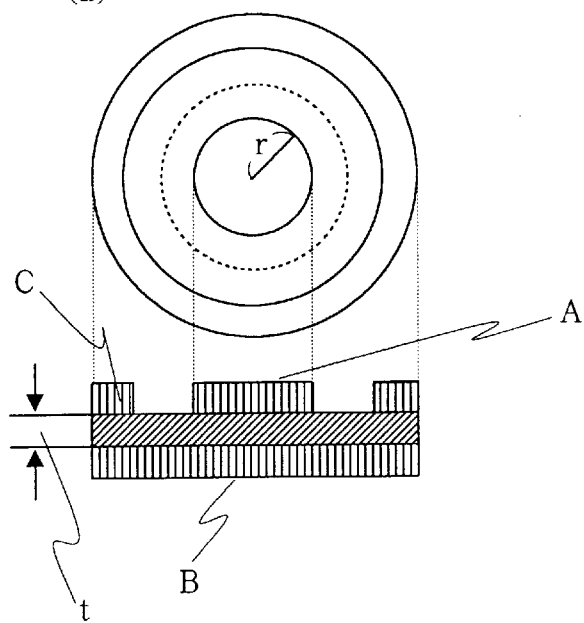
FIG. 11($a$) and FIG. 11($b$) are an explanatory view showing the measuring method of a specific resistance value.
Figure 11:
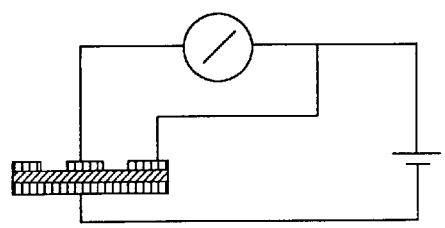

In the equation, a is a sectional area ($=\pi \times r^2$), and t is a thickness. In FIG. 11, A shows a main electrode, B a counter electrode, C a guard electrode and t a thickness of the sample.

A test tire was mounted on the actual vehicle, which was circularly revolved under the condition of lateral G of 0.4–0.5 at rudius of 80 m, and then peeling-off at the boundary face between the tread rubber and the conductive rubber layer was checked after 20 rounds. The case of apparently producing peeling-off was made durability x, and the case of no peeling-off was made durability o. The thus results obtained are shown in the following Table 3.

TABLE 3

| | | Conventional Example 1 | Comparative Example | Example 1 | Example 2 |
|---|---|---|---|---|---|
| Conductive rubber layer | Inserting position (refer to drawing) | Fig. 6 | Fig. 7 | Fig. 1 | Fig. 3 |
| | Specific resistance value (Ω · cm) | — | $10^5$ | $10^5$ | $10^5$ |
| | Tire width directional thickness (mm) | — | 5 | 1 | 1 |
| | Isolation length (b/W) (%) | — | — | 80 | 80 |
| Electrical resistance (Ω) | | $10^{11}$ | $10^6$ | $10^6$ | $10^6$ |
| Durability | | ○ | X | ○ | ○ |

EXAMPLE 3

With the use of the resulting rubber compositions for the silica-rich tread and the conductive rubber layer, a pneumatic radial tire (size 185/60R14) of tread structure shown in FIG. 4 was manufactured. This tire has a value of 0.024 in the ratio (A/B) of the sectional area A of the conductive rubber layer 2 to the sectional area B of the silica-rich tread rubber 1 in a width directional section of the tire. Moreover, the conductive rubber layer is 1.0 mm in thickness.

Conventional Example 2

Figure 9:
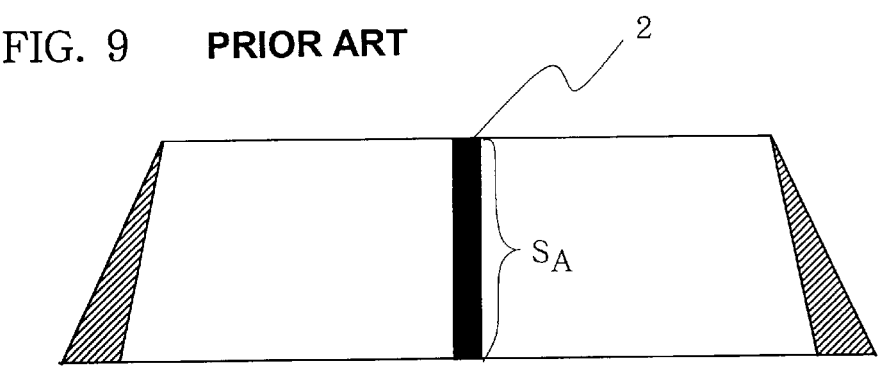
FIG. 9 is a sectional view schematically showing the tread portion of a pneumatic tire of Conventional Example 2.

With the use of the same rubber compositions as in Example 3, respectively, a pneumatic radial tire of the same size with the tread structure shown in FIG. 9 was manufactured. This tire has a value of 0.012 in the ratio (A/B) of the sectional area A of the conductive rubber layer 2 to the sectional area B of the silica-rich tread rubber 1 in a width directional section of the tire. Moreover, the width directional thickness of the conductive rubber layer is 1.0 mm.

A tread extrusion speed of Example 3 is indicated by an index based on 100 of Conventional Example 2. The larger the numerical value, the better the productivity. Moreover, tires of Example and Conventional Example were mounted on actual vehicles, a 2-hour slalom running test was carried out at a speed of 60 km/hr, occurrence of cracks on the connecting face between the conductive rubber layer and the silica-rich rubber layer at the tread was examined. The result obtained is shown in the following Table 4.

TABLE 4

| | Conventional Example 2 | Example 3 |
|---|---|---|
| Cross sectional ratio (A/B) | 0.012 | 0.024 |
| Productivity (extrusion speed) (index) | 100 | 200 |
| Existence of crack occurrence | Present | Non |

What is claimed is:

1. A method of manufacturing a pneumatic tire, the improvement which comprises the steps of; simultaneously extruding a tread portion of silica-rich compound and an antistatic conductive rubber layer, and forming said conductive rubber layer of 0.1–3.0 mm thick to a V- or a reverse V-shape in a width directional section of the tire at the tread.

2. A method of manufacturing a pneumatic tire, the improvement which comprises the steps of; dividing a tread portion of silica-rich compound into three portions in a V- or a reverse V-shape in a width directional section of the tire, adhering a conductive rubber layer consisting of a conductive rubber sheet or conductive cement layer to at least one of the surfaces created from the division, and thereafter connecting the three tread portions which were divided into one through said conductive rubber layer to thereby provide the tread portion with a conductive rubber layer having a V- or a reverse V-shape in the width directional section of the tire.

3. A method of manufacturing a pneumatic tire as claimed in claim 2, wherein a temperature is not less than room temperature when both the divided tread pieces are connected with each other.

4. A method of manufacturing a pneumatic tire as claimed in claim 2, wherein a press bonding step is provided after connecting said tread pieces each other.

5. A pneumatic tire comprising; a tread, a silica-rich compound rubber layer on at least the surface portion of said tread, said silica-rich compound rubber layer being divided at at least one portion in a width directional section of the tire by a conductive rubber layer extending in a circumferential direction substantially over the whole thickness of said rubber layer, wherein said conductive rubber layer is formed into a V- or reverse V-shape having a width in the range of 0.1–3 mm in a width directional section of said tire and a thickness direction distance (a) in a width directional section of said rubber layer and an edge face length (b) of said conductive rubber layer in a width directional section satisfy, a<b, wherein said V-shape conductive rubber layer has upper ends of said conductive rubber layer at a tread ground surface portion and a lower end thereof extends to a radially inner position substantially dividing the tread in a widthwise manner or said reverse V-shape has an upper end of said conductive layer extending to said tread surface to substantially divide the tread in a widthwise manner and lower ends thereof extend to a tread base.

6. A pneumatic tire as claimed in claim 1, wherein a specific resistance value of said silica-rich compound rubber layer is not less than $10^8$ Ω·cm, and a specific resistance value of said conductive rubber layer is not more than $10^6$ Ω·cm.

7. A pneumatic tire as claimed in claim 5, wherein said conductive rubber layer is 0.5–2.0 mm in width.

8. A pneumatic tire as claimed in claim 5, wherein said tread has at least two-layer structure comprising a cap rubber layer of said silica-rich compound rubber layer in its surface portion and a base rubber layer which is in downward from the cap rubber layer in the radial direction.

9. A pneumatic tire as claimed in claim 5, wherein said conductive rubber layer consists of a rubber cement layer having a specific resistance value of not more than $10^6$ Ω·cm.

10. A pneumatic tire as claimed in claim 5, wherein said conductive rubber layer consists of a conductive sheet having a specific resistance value of not more than $10^6$ Ω·cm.

11. A pneumatic tire as claimed in claim 5, wherein the ratio (A/B) of a sectional area A of said conductive rubber layer to a sectional area B of said silica-rich compound rubber layer in a width directional section of the tire is within a range of 0.02–0.1.

12. A pneumatic tire as claimed in claim 5, wherein said tread has at least two-layer structure comprising a cap rubber layer of said silica-rich compound rubber layer in its surface portion and a base rubber layer which is in downward from the cap rubber layer in the radial direction, and the ratio (A/B) of said sectional area A of said conductive rubber layer to said sectional area B of said cap rubber layer in a width directional section of the tire is within a range of 0.02–0.1.

13. A pneumatic tire as claimed in claim 5, wherein both wings of said tread are provided with miniside rubber layers.

* * * * *